United States Patent [19]

Namimoto

[11] Patent Number: 5,101,342
[45] Date of Patent: Mar. 31, 1992

[54] MULTIPLE PROCESSOR DATA PROCESSING SYSTEM WITH PROCESSORS OF VARYING KINDS

[75] Inventor: Keiji Namimoto, Yokohama, Japan

[73] Assignee: Kabushiki Kaisha Toshiba, Kawasaki, Japan

[21] Appl. No.: 353,175

[22] Filed: May 16, 1989

Related U.S. Application Data

[63] Continuation of Ser. No. 826,268, Feb. 5, 1986, abandoned.

[30] Foreign Application Priority Data

Feb. 6, 1985 [JP] Japan .................................. 60-21069

[51] Int. Cl.⁵ .......................... G06G 1/24; G06G 9/45
[52] U.S. Cl. .................................... 395/800; 364/228;
364/228.1; 364/229; 364/229.1; 364/230;
364/230.3; 364/231; 364/232.7; 364/238;
364/239; 364/239.3; 364/280; 364/280.1;
364/280.2; 364/280.3; 364/280.4; 364/DIG. 1;
364/DIG. 2
[58] Field of Search ... 364/200 MS File, 900 MS File, 364/300, 130-135, 140

[56] References Cited

U.S. PATENT DOCUMENTS

| | | | |
|---|---|---|---|
| 3,537,074 | 10/1970 | Stokes et al. | 364/200 |
| 4,014,005 | 3/1977 | Fox et al. | 364/200 |
| 4,075,693 | 2/1978 | Fox et al. | 364/200 |
| 4,247,892 | 1/1981 | Lawrence | 364/200 |
| 4,370,709 | 1/1983 | Fosdick | 364/200 |
| 4,394,727 | 7/1983 | Hoffman et al. | 364/200 |
| 4,467,436 | 8/1984 | Chance et al. | 364/133 |
| 4,484,273 | 11/1984 | Stiffler et al. | 364/200 |
| 4,527,237 | 7/1985 | Frieder et al. | 364/200 |
| 4,947,478 | 8/1990 | Maeno | 364/200 |

FOREIGN PATENT DOCUMENTS

WP84/04190 10/1984 PCT Int'l Appl. ................. 364/133
2154794 9/1985 United Kingdom

OTHER PUBLICATIONS

*Microcomputer Hardware Handbook*, 1st ed. Pomona, Calif., Elcomp Publishing, Inc., 1982, pp. 315, 319, 320, 389, 390, 471, 473.

Primary Examiner—Thomas C. Lee
Assistant Examiner—Robert B. Harrell
Attorney, Agent, or Firm—Finnegan, Henderson, Farabow, Garrett and Dunner

[57] ABSTRACT

This data processing system has different kinds of microprocessors, a memory bus, a memory which is connected to the microprocessors through the memory bus, and a control circuit to selectively activate one of the microprocessors. A feature of the control circuit of this data processing system is that it has a selection controller in which a selection data item is set by the active one of the microprocessors and a selector for supplying rest mode signals to the microprocessors, excluding the one microprocessor corresponding to the content of the selection controller.

8 Claims, 1 Drawing Sheet

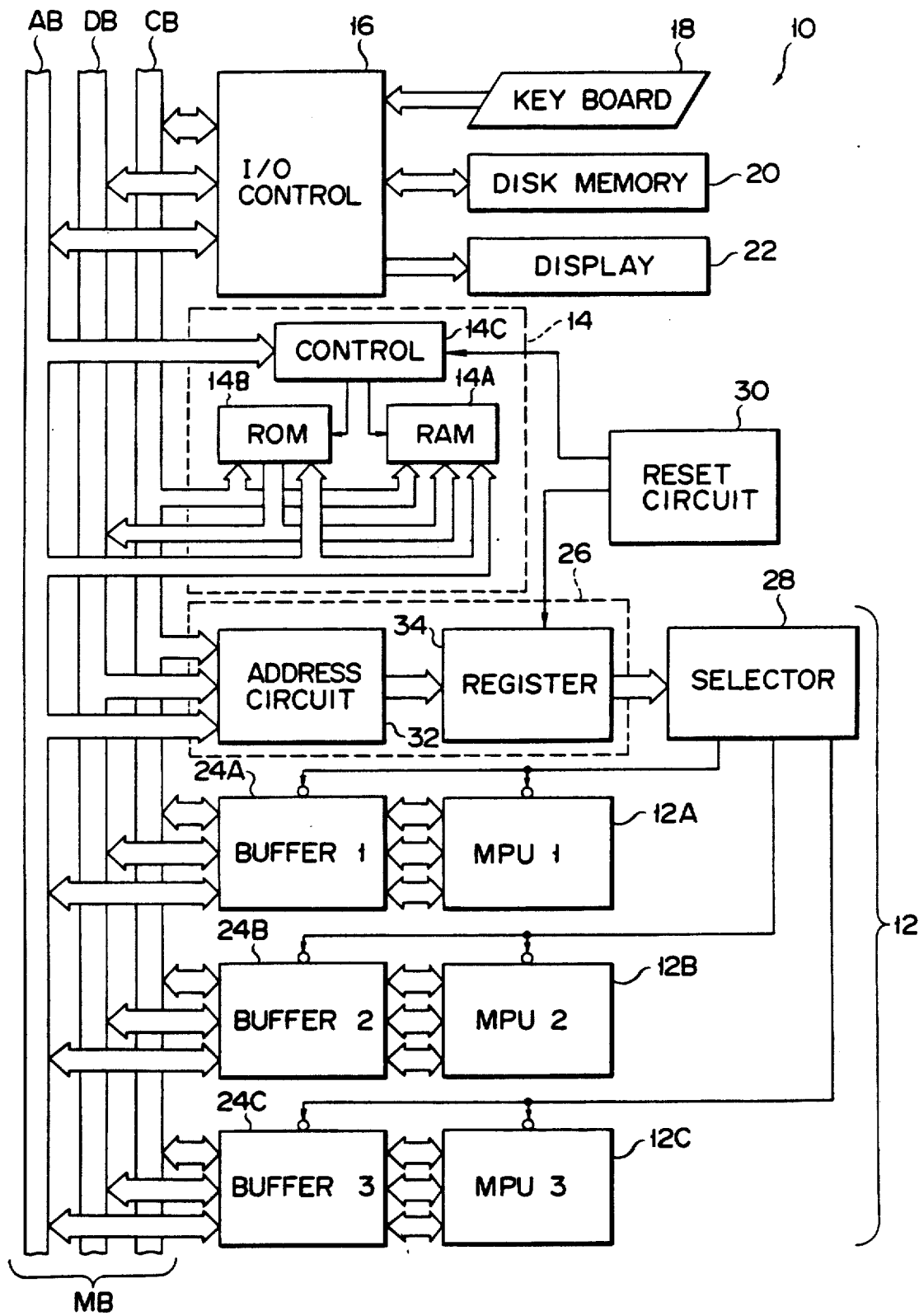

MULTIPLE PROCESSOR DATA PROCESSING SYSTEM WITH PROCESSORS OF VARYING KINDS

This application is a continuation of application Ser. No. 06/826,268, filed Feb. 5, 1986, now abandoned.

BACKGROUND OF THE INVENTION

The present invention relates to a data processing system having different kinds of processing units and, more particularly, to a data processing system in which one of these processing units is selectively activated.

In recent years, various kinds of microprocessors of relatively cheap prices have been put on the market. For example, many types of intelligent equipment such as word processor systems, communication apparatuses, and the like use a general purpose microprocessor as a major unit for data processing. For the manufacturers of such intelligent equipment, programming of the general purpose microprocessor, namely, development of the software, is the work that is almost as important as design of the peripheral hardware of this general purpose microprocessor.

In development of the software of the intelligent equipment, the developer first makes a source program corresponding to a desired sequence, for example, a word processing sequence. The source program, in this case, is ordinarily written in a language such as, assembly language or a high level language which is easy for the developer to understand. After making the source program, the developer makes an object program using a software development tool or system having an assembler or compiler. The source program is converted by the assembler or compiler to the object program consisting of binary code which can be executed by the special microprocessor. This object program is preliminarily stored into, for example, a ROM, disk memory, or the like prior to being executed by the intelligent equipment.

Hitherto, a data processing system having one microprocessor has been used as the aforementioned software development tool. In the case where a single software development tool is used for development of software for various kinds of intelligent equipment, this development tool needs dedicated assembler or compiler programs corresponding to each of different kinds of microprocessors. Due to this requirement, the software development tool having one microprocessor has the following two drawbacks.

The first drawback is that the object program made cannot be easily debugged in many cases. Namely, when the microprocessor of this development tool is of the same type as the microprocessor to be used in the intelligent equipment, the microprocessor of the development tool can execute and test the object program for the purpose of debugging. However, in the case where the kind of microprocessor of the development tool differs from that of the intelligent equipment, the microprocessor of the development tool cannot be used to debug the object program unless an emulation is executed. This is because the binary code of the object program is recognized as another instruction different from the inherent instruction by the microprocessor of the development tool. In the emulation, the processor of the development tool recognizes the binary code of the object program as data instead of as an execution instruction and virtually executes the object program. However, for this emulation, a plurality of emulation programs must be prepared in accordance with the kinds of microprocessors to be emulated.

The second drawback is that it takes a fairly long time and a high cost to make cross assembler or cross compiler programs corresponding to each of the microprocessors for which software is to be developed. These assembler programs and compiler programs can be executed by the microprocessor of the development tool but produce binary code which can be executed by the microprocessor for which the software is being developed. Generally, the persons who put microprocessors on the market provide reasonably priced self assemblers which produce binary code which can be executed by the microprocessor on which the self assembler is being executed. However, it is the rare case where the suppliers also provide a cross assembler for allowing object programs for their microprocessor to be made by a microprocessor of a different type. It is obvious that a plurality of cross assemblers must be prepared in addition to up to one self assembler in order to allow one microprocessor in the software development tool to make the object programs for various kinds of microprocessors. The number of cross assemblers increases in proportion to the number of kinds of microprocessors for which the software development tool must produce object code. Particularly, in recent situation such that a number of microprocessors of the latest model are developed, there is a large risk such that the time and costs are in vain due to production of cross assemblers.

In addition, although there is not directly concerned with the software development, Japanese Patent Unexamined Publication No. 129673/1983 discloses a data processing system having different kinds of microprocessors. According to this data processing system, the execution programs of the first and second microprocessor units are stored into a single memory unit. This memory unit is connected to the first and second microprocessor units through an address bus and a data bus. Each microprocessor unit selects one of memory locations in the memory unit through the address bus and receives the content at the memory location selected, namely, the processing instruction through the data bus. This data processing system further has an instruction interpreting section, a flip-flop, and a selecting circuit. The instruction interpreting section is connected to the memory unit through the data bus. When change instructions of the first and second microprocessor units are read out from the memory unit, the instruction interpreting section generates an output data to designate either one of the first and second microprocessors in accordance with this instruction. The flip-flop receives the output data from the instruction interpreting section and holds it. The selecting circuit is connected to the flip-flop and activates one of the first and second microprocessor units and also inactivates the other in accordance with the data held in the flip-flop.

However, the instruction interpreting section of this data processing system cannot help increasing in scale since its structure is remarkably complicated due to the following reasons. In other words, the function of the instruction interpreting section itself is equivalent to one microprocessor. The first reason is that the data bus transfers not only the execution instructions of the first and second microprocessor units but also the processing data. Therefore, the instruction interpreting section must discriminate whether the binary code on the data bus is the instruction or the data. The second reason is that the instruction interpreting section must preliminarily know which one of the first and second microprocessor units is active. Otherwise, the instruction interpreting section cannot distinguish whether the processing instruction on the data bus is the processing instruction for the first microprocessor unit or for the second microprocessor unit. In addition to this, there is the case where the processing instruction is constituted by the number of bits larger than the width of the data bus. In this case, the processing instruction is divided into a plurality of words and stored into the memory unit and each word is read out sequentially from the memory unit at a different time. Therefore, to detect the change instructions of the first and second microprocessor units with certainty, the instruction interpreting section must know for each processing instruction, the number of words which will be transferred through the data bus. The third reason is that the change instruction must be the binary code for the non-execution (No op) instruction for the active microprocessor. With the structure having the first and second microprocessor units, the binary code to switch from the first microprocessor unit to the second microprocessor unit and the binary code to switch from the second microprocessor unit to the first microprocessor unit are needed. Namely, the binary codes which can be used as the change instructions are limited. Therefore, the instruction interpreting section must inevitably discriminate the binary code of two or more bytes as the change instruction.

On the other hand, in the case where a DMA (direct memory access) is provided in this data processing system, data is transferred through the data bus between the memory unit and the I/O devices irrespective of the first and second microprocessor units. This causes the structure of the instruction interpreting section to be further complicated.

SUMMARY OF THE INVENTION

It is an object of the present invention to provide a data processing system in which the structures of control hardware and software selectively activate one of different kinds of microprocessors are extremely simple.

According to the invention, a data processing system is provided and this system comprises: different kinds of processing units each of which has an input terminal for receiving a rest mode signal, and each of which is made inoperative in response to the rest mode signal and is active when the rest mode signal is not supplied; a bus section having address, data and control busses for respectively transferring address, data and control signals; a memory unit, connected to the processing units, which stores a plurality of execution programs to be respectively executed by the processing units, and a selection control section, having at least one specified address and connected to the processing units through the bus section, which receives and stores selection data in response to an address selection effected by the active unit of the processing units and supplies the rest mode signal to all input terminals of the processing units except the one designated by the stored selection data, the selection data being generated from the active processing unit.

According to the above invention, the selection control section is regarded as a peripheral I/O device to the different kinds of the processing units. The selection control section supplies the rest mode signal to all processing units except the one to be active. When the active processing unit is changed to an alternative one, the active processing unit generates the selection data designating the corresponding alternative processing unit. The selection control section refers to the selection data to generate the rest mode signal. The active processing unit directly selects the address of the selection control section to set the selection data in the section. In the system, the selection control section can select one of the processing units regardless of the instructions fetched from the memory unit. Therefore, the selection control section can be constituted by less hardware due to its simple function. The large part of the memory areas of the memory unit are not required to store the routines which are additionally involved in the execution programs for allowing the corresponding processing units to set the selection data into the selection control section. In addition, this invention reduces the manufacturing cost of the system, since the different kinds of processing units perform independent processings using the same bus section and memory unit. When this system is used for developing software to be executed on microprocessors of the same types as the processing units, self assembler programs or self compiler programs are stored in the memory unit as the execution programs. There is no need to use cross assembler programs or cross compiler programs.

BRIEF DESCRIPTION OF THE DRAWING

The attached FIGURE is a block diagram of a data processing system of an embodiment of the present invention.

DETAILED DESCRIPTION OF THE PREFERRED EMBODIMENT

An embodiment of the present invention will be described with reference to the attached FIGURE. The FIGURE shows a data processing system 10 which is used as, for example, a software development tool. Data processing system 10 preferably has a processing section 12 to perform data processes on 16-bit data, a memory section 14, and an input/output (I/O) control section 16. These sections 12, 14, and 16 are interconnected by a memory bus MB. Memory bus MB includes an address bus AB, a data bus DB, and a control bus CB. I/O control section 16 is connected to I/O devices such as a keyboard 18, a disk memory unit 20, a display unit 22, and the like. I/O control section 16 is selected by processing section 12 through address bus AB and controls the data transfer between the specific I/O device and data bus DB. Processing section 12 includes different kinds of microprocessors, for example, first to third microprocessors 12A, 12B, and 12C and buffer circuits 24A, 24B, and 24C. Each microprocessor has an input or reset terminal to receive a rest mode signal to control the suspension of the operation of the microprocessor and to cause the microprocessor to enter a inoperative state. Microprocessors 12A, 12B, and 12C are connected to memory bus MB through respective buffer circuits 24A, 24B, and 24C and there is the parallel relationship thereamong. Buffer circuits 24A, 24B, and 24C cancel the differences of the Input/Output characteristics (e.g., logical combinations of read/write control signals, input/output impedances and input/output voltages) among microprocessors 12A, 12B, and 12C, for data transfer through memory bus MB. Each of buffer circuits 24A, 24B, and 24C has a control terminal to receive the rest mode signal and to set the output impedance of the buffer circuit to a high enough value in response to this rest mode signal. At this time, the corresponding microprocessor is electrically separated from memory bus MB. The programs to be executed by the first to third microprocessors (e.g., the assembler programs) preliminarily reside in disk memory unit 20 and are read out from disk memory unit 20 to memory section 14 immediately before the execution.

Processing section 12 further includes a selection controller 26, a selector 28, and a reset circuit 30. Selection controller 26 has an address circuit 32 and a two-bit register 34. Address circuit 32 is connected to microprocessors 12A, 12B, and 12C through memory bus MB and respective buffer circuits 24A, 24B, and 24C. Address circuit 32 has one I/O address and is selected through address bus AB by an active one of microprocessors 12A, 12B, and 12C. During this selection, address circuit 32 is supplied with two-bit selection data from the same microprocessor through data bus DB and with a read enable signal through control bus CB. Address circuit 32 sets the selection data into register 34 synchronously with the read enable signal. The system has a power switch (not shown) for controlling a power supply to each circuit element in a manner known to persons skilled in the data processing art. The power switch is turned on by, for example, a human operator to start the operation or this system. Reset circuit 30 generates a system reset signal when power is supplied to it from the power supply. This system reset signal causes register 34 to be reset to "00". After an elapse of a predetermined time, reset circuit 30 sets a predetermined data, for example, data "01" to designate first microprocessor 12A, into register 34. The content of register 34 is supplied to selector 28 and decoded by selector 28. Selector 28 has first to third output terminals corresponding to the number of microprocessors 12A, 12B, and 12C. The first output terminal of selecter 28 is connected to a reset terminal of microprocessor 12A and a control terminal of buffer circuit 24A. The second output terminal of selector 28 is connected to a reset terminal of microprocessor 12B and a control terminal of buffer circuit 24B. The third output terminal of selector 28 is connected to a reset terminal of microprocessor 12C and a control terminal of buffer circuit 24C. Selector 28 generates the rest mode signals from the first to third output terminals if register 34 is reset to "00". Otherwise, selector 28 generates the rest mode signals from the output terminals excluding one of the first to third output terminals. Namely, when the content of register 34 is "00", all of first to third microprocessors 12A, 12B, and 12C are made inoperative. When the content of register 34 is "01" the first microprocessor 12A is made active and the others 12B and 12C are made inoperative. When the content of register 34 is, "10", the second microprocessor 12B is made active and the others 12A, 12C are made inoperative. When the content of register 34 is "11", the third microprocessor 12C is made active and the others 12A, 12B are made inoperative.

The structure of memory 14 will now be described in detail. Memory 14 has a RAM 14A into which the execution programs of microprocessors 12A to 12C are alternately loaded, a ROM 14B storing the loader program which allows, for example, first microprocessor 12A to load the execution program of first microprocessor 12A into the RAM 14A from disk memory unit 20, and a memory control circuit 14C to select between ROM 14B and RAM 14A. An initial memory area in the RAM 14A has the same address as that of a memory area in the ROM 14B. The loader program starts from the head address location in the ROM 14B. The control circuit 14C inhibits the readout from the RAM 14A and permits the readout from the ROM 14B in response to a system reset signal from reset circuit 30. After completion of the program loading, this control circuit 14C inhibits the readout from the ROM 14B and permits the readout from the RAM 14A due to a control of microprocessor 12A.

Disk memory unit 20 preliminarily stores various kinds of execution programs which are executed by first, second, and third microprocessors 12A, 12B, and 12C, respectively. In this embodiment, the various kinds of execution programs preferably are three kinds of self assembler programs which are used for software development of intelligent equipment having the same kind of microprocessors as the first to third microprocessors. For instance, the first self assembler program consists of binary code which can be interpreted by first microprocessor 12A, and which makes an object program which can be executed by first microprocessor 12A. The second self assembler program consists of binary code which can be interpreted by second microprocessor 12B, and which makes an object program which can be executed by second microprocessor 12B. The third assembler program consists of binary code which can be interpreted by third microprocessor 12C, and which makes an object program which can be executed by third microprocessor 12C.

Each execution program includes a routine for allowing the active microprocessor to load the program to be executed next and a routine for setting the selection data to designate the microprocessor which executes this next loaded program into selection controller 26.

The operation of data processing system 10 will now be described. When the power switch is turned on, the reset signal from reset circuit 30 clears the contents of register 34. Consequently, selector 28 generates the rest mode signals from the first, second, and third output terminals of selector 28. Microprocessors 12A to 12C are held in the inoperative mode by the rest mode signals. During this period, buffer circuits 24A to 24C electrically separate microprocessors 12A to 12C from memory bus MB. Reset circuit 30 sets the content of register 34 to "01" after an elapse of a predetermined time required for all of the circuit elements to be set up. As a result of the changed contents of register 34, selector 28 stops generating the rest mode signal from the first output terminal and continues to generate the rest mode signals from the second and third output terminals. The supply of the rest mode signal to first microprocessor 12A is stopped, so that the first microprocessor 12A becomes active. Simultaneously, buffer circuit 24A electrically couples first microprocessor 12A with memory bus MB in response to cessation of the signal from reset circuit 30. On the other hand, the memory control circuit 14C responds to the system reset signal from reset circuit 30 and inhibits the readout of the instruction data from the RAM 14A. Due to, this, first microprocessor 12A fetches and executes instructions of the loader program in the ROM 14B. This fetch and execute process is well known in the data processing art and will not be described here.' Execution of the loader program causes microprocessor 12A to load the first self assembler program from disk memory unit 20 into the RAM 14A. Lastly, the loader executes the first self assembler program. The end of processing by the first assembler program and a change instruction of the processor are informed to microprocessor 12A, for example, by keyboard 18 by the first assembler program itself. The execution program of the microprocessor which is used next is loaded by microprocessor 12A from disk memory unit 20 into the available area in the RAM 14A. For example, in the case of using second microprocessor 12B, the second self assembler program is loaded. At this time, an initial jump instruction is set into that memory location (e.g., address "0" of RAM 14A which corresponds to the execution start address of second microprocessor 12B. After completion of this program loading, first microprocessor 12A outputs a selection data "10" to selection controller 26 via the memory bus MB. When the content of register 34 is updated to data "10", selector 28 stops generating the rest mode signal from the second output terminal and generates the rest mode signals from the first and third output terminals. Namely, first microprocessor 12A is made inoperative together with third microprocessor 12C and second microprocessor 12B is activated. The second microprocessor executes the second self assembler program already loaded into memory 14 from the initial execution address.

On one hand, in the case of using the third microprocessor as well, the changing can be performed in a manner similar to the above.

As described above, in the case where the active microprocessor selects by the address signal of selection controller 26 and sets the selection data to controller 26, complicated functions such as the conventional ones are not required for selection controller 26.

The operation of register 34 is independent of the kinds of microprocessors in the system. Therefore, an ordinary input/output register circuit, for example, an LSI of a parallel input/output interface (PIO) or the like may be directly used as register 34. In other words, the use of register 34 makes it possible to update the active microprocessor independently of the kinds of and the number of microprocessor by using the simplest input/output circuit (or one address location in the memory) and the existing signal line.

In the data processing system of the embodiment, memory section 14 and control section 16 as many as one system are provided: however, for processing section 12, a plurality of different kinds of microprocessors 12A, 12B and 12C are connected in parallel to memory bus MB and are designated by register 34 such that only, one of microprocessors 12A, 12B and 12C is made active. On the other hand, the rest mode signals are applied to the other microprocessors and the corresponding buffer circuits and their outputs are in the high impedance states and electrically separated from memory bus MB. Since the active microprocessor is easily changed by applying and canceling the rest mode signal in this manner, the hardware constitution is extremely simple, the software control is also simple, and the programs of various kinds of microprocessors can be executed by a remarkably simple procedure. In data processing system 10, different kinds of microprocessors 12A, 12B and 12C are selectively activated. Therefore, this system can utilize self assembler programs in the software development for the same kinds of microprocessors. There is no need to provide cross assembler programs to the system. As a result, a high cost performance is obtained in the system.

Although the rest mode signals are supplied to the reset terminals of the microprocessors 12A, 12B and 12C in the embodiment, the invention is not necessarily limited to the reset terminals. The invention also can be realized by the use of hold terminals, stop terminals, wait (ready) terminals, acknowledge terminals, or the like which are generally provided for general purpose microprocessors. In addition, instead of directly stopping the microprocessors, by electrically separating the microprocessors 12A, 12B and 12C to be inactivated from the memory bus MB by the buffer circuits 24A, 24B and 24C corresponding to the inactivated microprocessors, those microprocessors may be in the operative mode. However, in such a case, an attention must be paid to the setting of the start address or restart address when the active microprocessors was changed.

On the other hand, the data processing system of the invention is independent of the number of microprocessors. Further, with respect to the constitutions of register 34 and selector 28 as well, the number of bits of register 34 may be equalized to the number of microprocessors and the outputs of respective bits may be directly connected to the corresponding microprocessors, thereby enabling the respective microprocessors to be activated or inactivated. In this case, address circuit 32 may have plurality of I/O addresses to selectively designate the respective bits of register 34.

In addition, each of the microprocessors 12A, 12B and 12C is a sixteen bit microprocessor. However, the present invention is not limited to this. They may be 8-bit microprocessors. Or, the number of bits of respective microprocessors may differ.

What is claimed is:

1. A software developing apparatus comprising:
   bus means for transferring signals;
   register means, connected to the bus means, for storing selection data;
   memory means, connected to the bus means, for storing a plurality of control programs and source program data;
   a plurality of kinds of microprocessors having differing input/output characteristics, each microprocessor coupled to the bus means, for converting the source program data into a form executable by itself and for generating updated selection data stored in the register means, by executing a corresponding one of the plurality of control programs;
   control means, connected to said register means, for causing one of the plurality of microprocessors to be active and all other microprocessors to be inoperative and for electrically decoupling the other, inoperative, microprocessors from said bus means in accordance with said updated selection data; and
   compensating means, connected between said bus means and said plurality of microprocessors and controlled by said control means, for cancelling differences in input/output characteristics of said microprocessors, said differences including logical combinations of read/write control signals, input/output impedances and input/output voltages,
   wherein said control means includes control lines connected to respective reset terminals of said plurality of microprocessors.

2. A software developing apparatus according to claim 1, wherein the compensating means includes buffer circuits connected between the bus means and respective ones of the plurality of microprocessors and associated with each other to cancel the differences in the input/output characteristics of the microprocessors.

3. A software developing apparatus according to claim 2, wherein the bus means includes an address bus for transferring address signals, a data bus for transferring data signals, and a control bus for transferring control signals.

4. A software developing apparatus according to claim 5, wherein said register means includes a gating section responsive to a specified address signal generated from an active one of the microprocessors and supplied to said address bus, for receiving the updated selection data generated from the active one of the microprocessors together with said specified address signal and supplied to said data bus, and a register section for storing selection data supplied from said gating section.

5. A software developing apparatus according to claim 4, wherein said control lines of the control means are also connected to respective control terminals of said buffer circuits, and a selecting circuit for decoding selection data stored in said register section and supplying rest mode signals to all the control lines but one.

6. A software developing apparatus according to claim 4, wherein said register section is formed of 1-bit registers, and said control means includes control lines connected to respective reset terminals of said microprocessors and respective control terminals of said buffer circuits.

7. A software developing apparatus according to claim 1, further comprising a reset circuit, connected to a power supply, for setting selection data in said register means upon application of power from said power supply.

8. A software developing apparatus according to claim 1, wherein each of said control programs includes at least one of a self-assembler and a self-compiler.

* * * * *